March 25, 1941.  E. J. VON HENKE  2,236,162
HAND-WELDING TOOL
Filed May 19, 1938  3 Sheets-Sheet 1
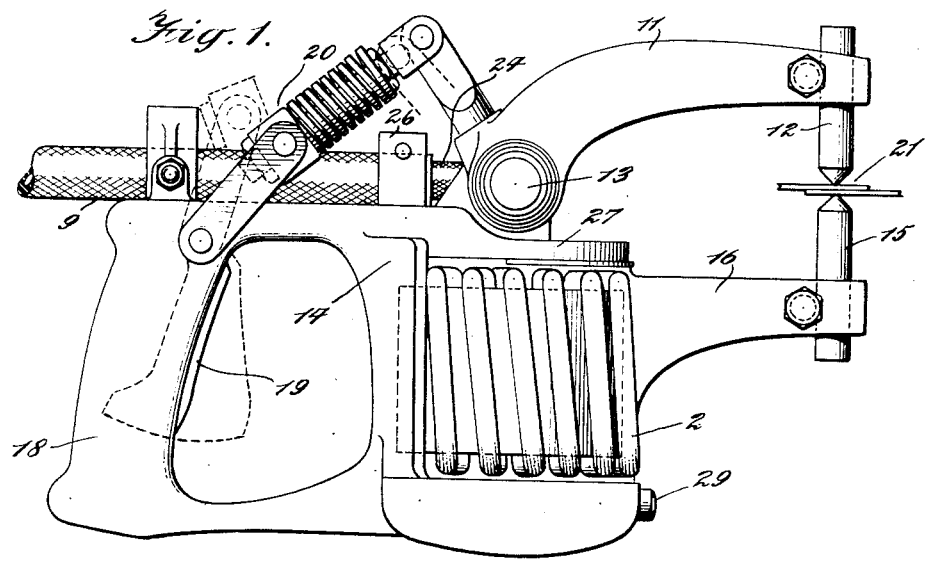
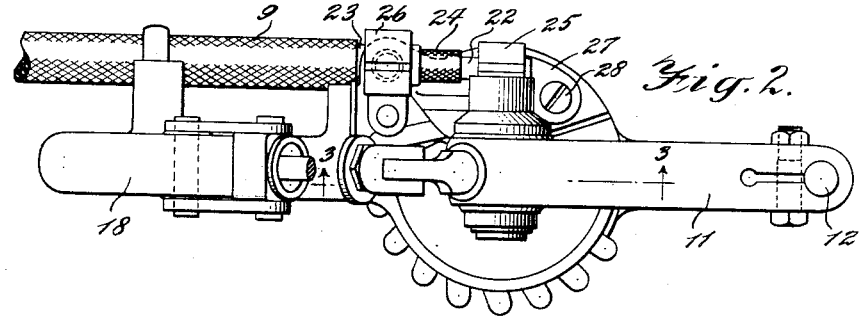
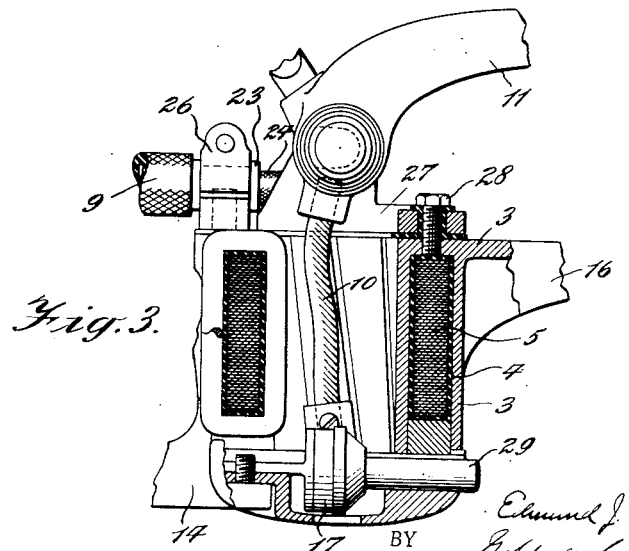
INVENTOR.
Edmund J. von Henke
BY
ATTORNEYS.

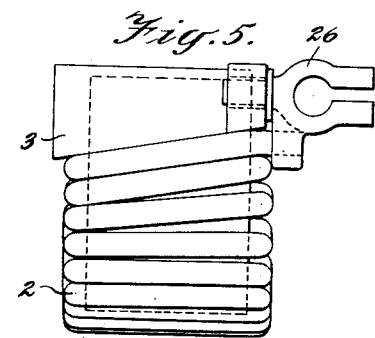
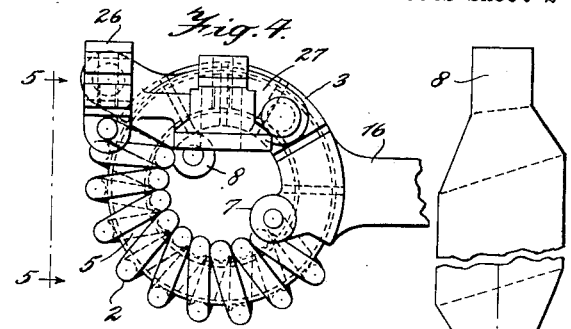
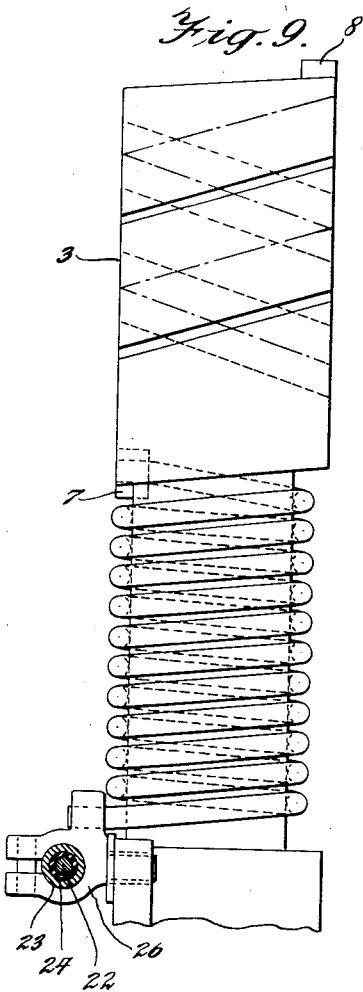
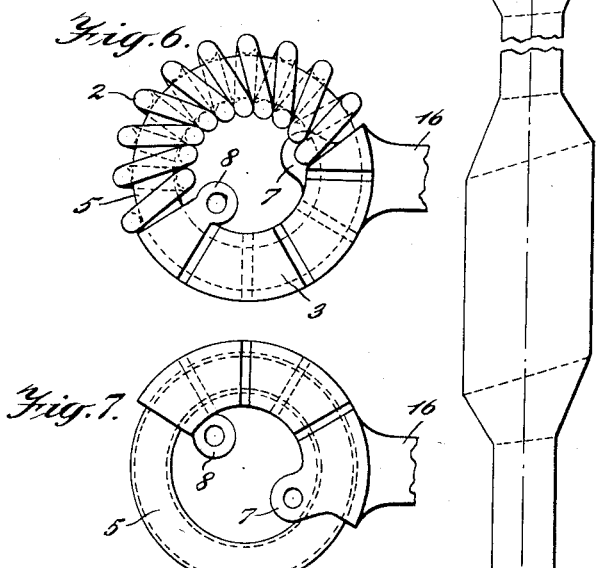
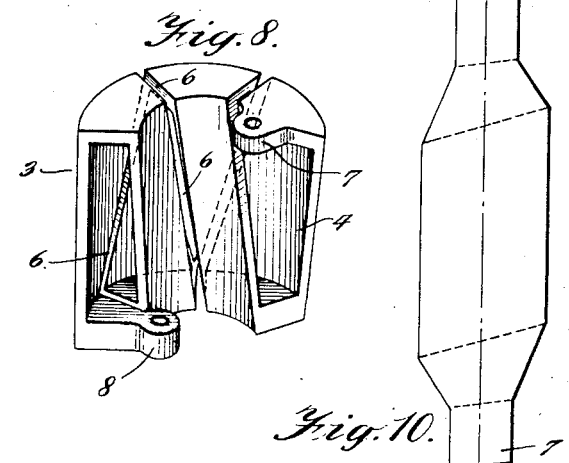

March 25, 1941.  E. J. VON HENKE  2,236,162
HAND-WELDING TOOL
Filed May 19, 1938  3 Sheets-Sheet 3
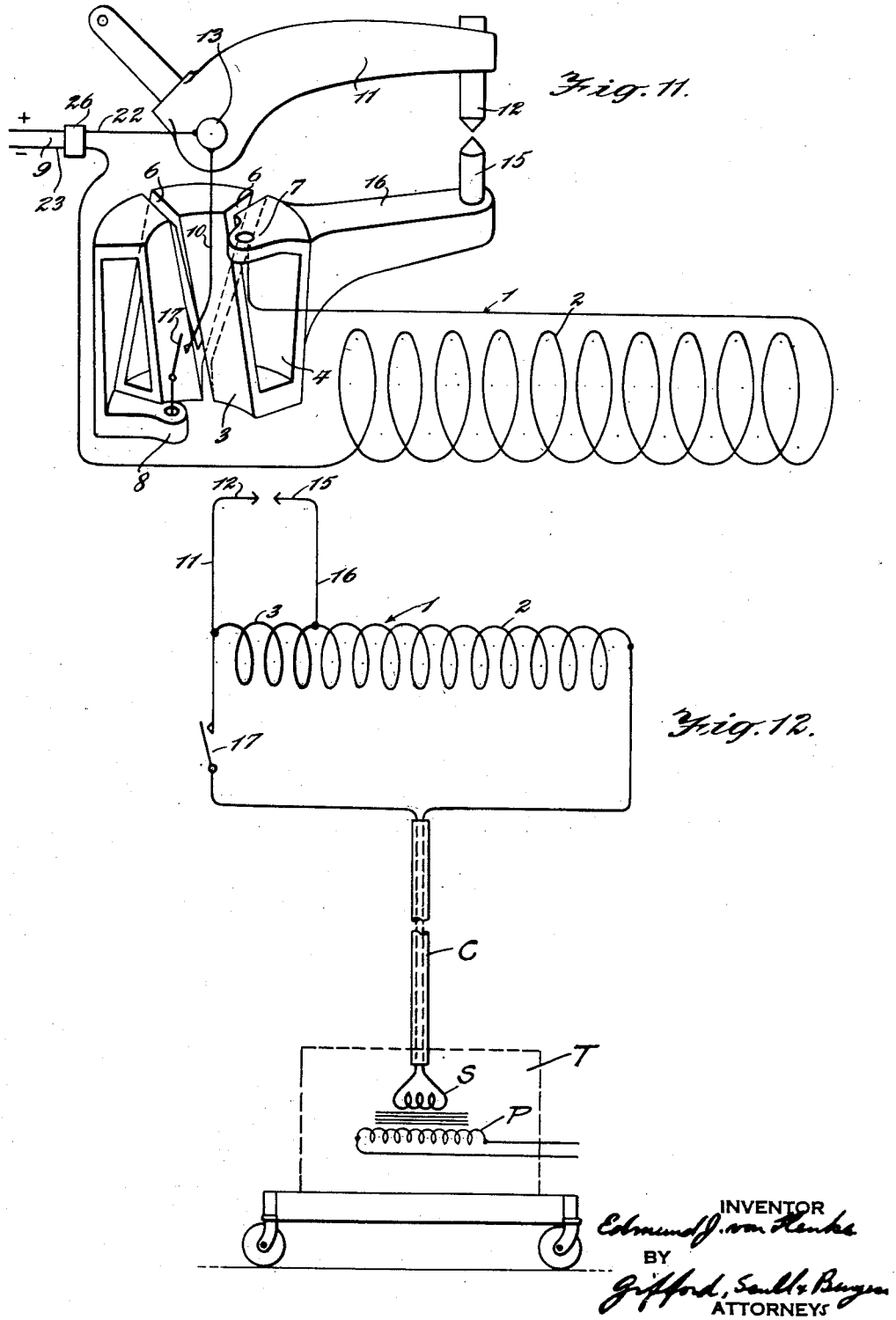
INVENTOR
Edmund J. von Henke
BY
Gifford, Scull & Burgess
ATTORNEYS Patented Mar. 25, 1941

2,236,162

UNITED STATES PATENT OFFICE 2,236,162

HAND-WELDING TOOL

Edmund J. von Henke, Chicago, Ill., assignor to American Electric Fusion Corporation, Chicago, Ill., a corporation of Illinois Application May 19, 1938, Serial No. 208,903

6 Claims. (Cl. 219—4)

This invention relates to a novel and improved form of hand-welding tool, the novel features of which will be best understood from the following description and the annexed drawings, in which I have shown a selected embodiment of the invention and in which:

Fig. 1 is a side elevation of one form which the invention may take;

Fig. 2 is a plan view of the structure appearing in Fig. 1;

Fig. 3 is a vertical longitudinal section through the structures shown in Figs. 1 and 2 and taken approximately on the line 3—3 of Fig. 2, parts being shown in elevation;

Fig. 4 is a plan view of the transformer;

Fig. 5 is a side elevation of the structure appearing in Fig. 4 and taken on the line 5—5 of Fig. 4;

Fig. 6 is a bottom plan view of the same structure;

Fig. 7 is a top plan view of certain of the parts appearing in Fig. 4, other parts being omitted;

Fig. 8 is a perspective view of part of the coil;

Fig. 9 is a development of the coil;

Fig. 10 is a further development of part of the coil;

Figs. 11 and 12 are diagrams illustrating the circuits controlling the operation of the device.

This application is a continuation in part of my co-pending application, Ser. No. 88,101, filed June 30, 1936.

The invention relates to a hand welding tool which may be used in the manner indicated, for example, in my prior Patents 1,723,984 and 1,853,101 (the former being a division of the latter), wherein I have shown a hand welding tool operated by current from a portable transformer. Such a transformer is indicated herein in Fig. 12 by the character T and, for the purpose of illustration, it is shown as mounted upon a truck by which it may be readily moved from one job to another or from one part of a job to another. In said prior patents, the welding tool is connected to the transformer by means of flexible cables. Since the current from the secondary of the transformer is conveyed by these cables to the tool, the cables must be of relatively large cross-section and must be cooled, thereby making them heavy. Therefore the length of the cable used in devices constructed according to said patents is limited to some distance on the order of six feet.

For example, assuming that the voltage in the primary of such a device is about 220 or 440 volts, a voltage of about 16 to 20 volts in the secondary is necessary to force the heavy secondary welding current through the cables to the welding tool and through the weld being formed by the tool. The cables have to carry the entire welding current between the secondary of the transformer and the tool, thus being called upon to carry some 7000 or 8000 amperes. Therefore, the cables have to be very heavy in cross-section and must usually be cooled. Thus they are correspondingly clumsy to handle and their length has to be limited. Moreover, the arrangement is not as efficient as desirable because, for example, assuming a load on the weld of 8 kw., the demand on the source of supply would be in the neighborhood of 80 kva., resulting in a very low power factor and a relatively inefficient arrangement.

Some of the disadvantages of the arrangement shown in said patents were overcome by the construction shown in my Patent 1,779,365. In this arrangement the portable transformer was eliminated and the transformer incorporated directly in the hand tool. Thus the welding circuit was made very short and closely adjacent to the weld. This eliminated the necessity for the heavy cables to carry the welding current from the portable transformer to the tool. Instead, the current was brought to the tool by means of relatively light flexible conductors and the welding current was limited to the welding tool alone.

This arrangement has resulted in a much more efficient combination, inasmuch as for a load, for example, of 8 kw. at the weld, only 8 kw. is demanded from the power supply, which is at the tool. The power factor of this combination accordingly is very high and the tool operates very efficiently. However, it has the drawback that separate primary and secondary coils of the welding transformer are incorporated in the tool. This means that they have to be separated by insulation and, inasmuch as in welding operations there is always present a certain amount of moisture from water cooling, together with metallic dust and other forms of dirt, these factors render the insulation useless after a relatively short space of time. This matter has to be watched very carefully. Furthermore, the tool still is heavier than desirable, inasmuch as both primary and secondary windings must be separate, resulting in a total weight which is heavier than desirable for convenient handling as a portable tool.

To obviate the above difficulties, I have evolved the arrangement described herein in which I again employ a portable transformer, preferably mounted on a truck as before. This transformer may be of any suitable form, the details of which are not necessary to an understanding of the invention and therefore will not be dwelt upon.

For example, assuming that the primary circuit of the transformer carries a voltage of 220 or 440 volts as before, from a source of central station current, I may design the transformer so as to take from its secondary a voltage of approximately 35 to 40 volts, to force a current of, say, 600 amperes through a light flexible cable to an auto-transformer incorporated in a hand tool, this amperage being relatively low. In this auto-transformer the primary and the secondary circuits are shown as joined in series and wound around a core. By this means I may transform the current passing through the flexible cable to a heavy current of sufficiently high amperage to perform the welding operation. For example, this amperage may be on the order of 7000 to 8000 amperes.

This arrangement makes the welding circuit very short and compact, avoiding the necessity of separate coils for the primary and secondary, and thus resulting in a light-weight tool. It also does away with the necessity of any insulation between the primary and secondary, avoiding the disadvantages mentioned above. Moreover, the primary, instead of requiring a relatively high voltage of 220 or 440 volts as in my prior Patent 1,779,365, needs only a relatively low voltage, in this example assumed to be some 35 to 40 volts, which is not large enough to be dangerous to the workman handling the tool. The connecting cable may also be relatively light as it only carries a relatively small amperage.

This arrangement, therefore, permits the length of the flexible cable to be increased materially beyond the length which would be permissible, say, in the construction shown in my prior Patents 1,723,984 and 1,853,101 and thus all the advantages of the construction shown in my Patent 1,779,365 are obtained, with the additional advantage of materially decreasing the weight of the tool.

In Fig. 12 I have indicated a portable transformer T mounted on a truck. This transformer may comprise a primary P and a secondary S of any usual construction, the details of which may vary widely and therefore will not be dwelt upon here. The secondary may be connected by conductors in a flexible cable C to opposite ends of a coil 1 comprising two parts 2 and 3. Both of these parts may be of the same construction, but it is more desirable to have parts of different constructions, for example as shown herein. The part 2 may be formed of ordinary electric conducting cable, and the part 3 is shown as of a special construction adapted to have greater structural strength.

The part 3 is shown as a section of a hollow ring having a chamber 4 within which may be placed the core 5 of the transformer. The ring is separated into a plurality of turns by means of a continuous slot 6, here shown as spiral. If desired, the entire coil could be formed in this manner, but ordinarily the use of an electric cable or other flexible conductor is less expensive. However, I consider it within the scope of the invention to form the entire coil in the form of a hollow ring, a section of which only is shown herein.

One of the end turns of the part 3 is provided with an inwardly extending ear 7, and the other with an inwardly extending ear 8. The cable forming the part 2 has one end connected to the ear 7 and the other end connected to one side of a source of current indicated as a flexible cable 9. The ear 8 is connected by a suitable conductor 10 to a horn 11 adapted to support an electrode 12. This horn is pivotally mounted at 13 upon the frame 14 of the tool and is connected to the other side of the source of electric current exemplified by the cable 9. The other electrode 15 which is adapted to cooperate with the electrode 12 to weld work therebetween is supported upon a second horn 16 which is rigidly connected to one of the turns of the hollow ring. A suitable switch 17 is inserted in the conductor 10 or in any other suitable place.

With the above arrangement, it will be seen that I have provided an auto-transformer which is rendered operative, first, by closing of the switch 17 and, second, by movement of the electrodes into contact with the work.

The frame 14 may take any suitable form and therefore the details will not be discussed. In the illustrated embodiment, a suitable handle 18 is provided by means of which the tool may be manipulated, and conveniently adjacent the handle is a trigger 19 which may be moved from the dotted line to the full line position shown in Fig. 1 to operate a toggle 20 and thus move the horn 11 on its pivot 13 to press the electrodes against opposite sides of the work, which is indicated diagrammatically at 21 as a lap joint which is to be welded.

The cable 9 is of the concentric type having a central conducting member 22 and an outer conducting member 23 separated by insulation 24, best shown in Fig. 9. The conductor 22 may be electrically connected to the horn 11 by means of a clamp 25, and the conductor 23 may be connected to the coil and more particularly to the part 2 thereof by means of a clamp 26.

The pivot 13 is supported on a bearing plate 27 forming part of the frame 14, and the part 3 of the coil may be secured in place by one or more screws 28 passing through the plate 27 into the part 3. The switch 17 may be disposed adjacent the bottom of the frame and may be operated by a push button 29 conveniently arranged in front of the tool for engagement by the hand of the operator.

Referring now more particularly to Figs. 4 to 10, inclusive, I have shown therein various parts of the auto-transformer. The part 3 of this transformer may be formed first as an integral ring or section of ring, in this application the section only being indicated. The ring may be cast as one piece, with the hollow annular chamber 4 therein and with the wall or walls of that chamber continuous. Then the slot 6 may be formed in the wall of that chamber, extending continuously and in the general spiral form so as to provide the various turns of the coil as indicated. The ears 7 and 8 may be provided with the perforations shown, to receive the ends of the respective conductors.

In Fig. 10 I have shown a development of the part 3 of the coil, indicating therein the two ears 7 and 8. It will not be necessary to go into any detail description of this development. The horn 16 may be cast integral with the hollow ring or may be secured thereto after formation of the ring, whichever is desired. The part 2 of the coil may be formed by an ordinary electric cable of any suitable construction, one end of which will be received in the aperture in the ear 7, and the other end of which will be received in a similar aperture in an ear on the clamp 26. This cable need not be insulated except as may be necessary to separate the adjacent coils. No attempt has been made to indicate such insulation, as it is understood by those skilled in the art that insulation will be provided wherever necessary.

In operation, the electrodes 12 and 15 are brought into contact with the opposite sides of the work, after which the switch 17 is closed and the trigger 19 operated to create the necessary welding pressure. A low voltage current may be used, and therefore insulation of the turns of the coil may be substantially eliminated, thereby further decreasing the complexity and the expense of the tool. The device may be readily handled without danger because of the low voltage, but at the same time, by making use of the auto-transformer principle, a sufficient welding current will be obtained through the electrodes and the work held therebetween.

As another example of a suitable arrangement, the two electrodes are shown as being connected across three turns of the coil, the total number of turns being thirteen. Assuming that an electromotive force of ten volts is supplied by the secondary of the transformer T, and that the amperage of the current forced through the cable C by that force is 600 amperes for the thirteen turns, then the amperage for the three turns will be 2600 amperes minus the 600 amperes or 2000 amperes, which is sufficient for many welding purposes for which the tool is designed, although, as noted above, much higher amperage may be obtained by varying the specific design of the apparatus.

The necessary amperage for the welding current is thus obtained by an inexpensive and lightweight transformer which can be easily applied to a hand tool. The conducting cable 9 may be of ordinary standard size, and a much longer cable can be used to advantage than in connection with the tools of my aforesaid patents. Similarly, the necessity for cooling by water or other fluid is eliminated. These advantages have been more fully discussed above.

While in the claims the expression "source of electric current" will be used, it is of course to be understood that this current will be alternating or pulsating current, since the auto-transformer principle is applicable only to alternating or pulsating current. It will also be seen that by the use of the above arrangement it is possible to use high frequency current, which can be done to much better advantage than with other arrangements, for example those shown in my prior patents referred to above.

While I have shown the invention as embodied in a specific form, it is to be understood that various changes in details may be made without departing from the scope of the invention, as defined by the appended claims.

I claim:

1. An electric welding tool for pure manual manipulation comprising a core, a coil with a plurality of turns around said core and having its ends connected to a source of electric current, two welding electrodes, one movable with respect to the other, means to move said movable electrode into position to cooperate with the other electrode to weld work therebetween, and means connecting said electrodes across a number of said turns less than the total number thereof, said last mentioned turns being exposed, and spaced along the core from the remaining turns.

2. An electric welding tool comprising a core, a coil with a plurality of turns around said core and having its ends connected to a source of electric current, two welding electrodes, one movable with respect to the other, means to move said movable electrode into position to cooperate with the other electrode to weld work therebetween, one of said electrodes being electrically connected to said coil adjacent one end of said coil and the other electrode being electrically connected to a turn of said coil intermediate the ends of the coil, the turns intermediate said electrodes being self-supporting, and the remaining turns being in a single layer spaced along the core from said self-supporting turns.

3. An electric welding tool comprising a core, a coil having a plurality of turns around said core and comprising a section of a hollow ring within which the core is disposed, said section having its walls cut by a spiral slot, to form a plurality of turns, a horn secured to one of said turns and adapted to support an electrode, a second relatively movable electrode arranged to cooperate with the first-named electrode to weld work therebetween, means to move said second electrode towards and away from the other, a source of electric current, and means connecting each electrode to said source, said coil having a plurality of turns between said horn and said source.

4. An electric welding tool comprising a frame, an electrode pivotally mounted on said frame, a core and a coil surrounding it and supported in fixed position on said frame but insulated therefrom, one of the turns of said coil having structural strength, a stationary electrode carried by said turn, means to move said pivoted electrode towards and away from the stationary electrode, and means to supply electric current to said electrodes.

5. An electric welding tool comprising a core and a coil surrounding it, one of the turns of the coil having structural strength, stationary and pivoted electrodes insulated from each other and one of which is supported on said turn, means supporting the other electrode in operative relation to the one on said turn, means to move said pivoted electrode towards and away from said stationary electrode to weld work therebetween, and means to supply electric current to said electrodes.

6. An electric welding tool for pure manual manipulation comprising, in combination, relatively movable welding electrodes, an annular core, a single layer, spaced-turn coil extending over all of said core, means to connect a source of current to the ends of said coil, means to deliver welding current direct to said electrodes from a minor portion of said coil, the whole of said coil being exposed for air cooling.

EDMUND J. VON HENKE.